United States Patent
Heikkinen et al.

(10) Patent No.: US 11,550,295 B2
(45) Date of Patent: Jan. 10, 2023

(54) CONTINUOUS EXPOSURE

(71) Applicant: EOS GmbH Electro Optical Systems, Krailling (DE)

(72) Inventors: Hannu Heikkinen, Kaarina (FI); Tatu Syvänen, Preitilä (FI); Michael Göth, Munich (DE); Ludger Hümmeler, Gauting (DE); Thomas Hoferer, Gauting (DE)

(73) Assignee: EOS GmbH Electro Optical Systems, Krailling (DE)

( * ) Notice: Subject to any disclaimer, the term of this patent is extended or adjusted under 35 U.S.C. 154(b) by 560 days.

(21) Appl. No.: 16/497,477

(22) PCT Filed: Mar. 31, 2017

(86) PCT No.: PCT/EP2017/057770
§ 371 (c)(1),
(2) Date: Sep. 25, 2019

(87) PCT Pub. No.: WO2018/177553
PCT Pub. Date: Oct. 4, 2018

(65) Prior Publication Data
US 2020/0033835 A1 Jan. 30, 2020

(51) Int. Cl.
*B33Y 50/02* (2015.01)
*B22F 10/20* (2021.01)
(Continued)

(52) U.S. Cl.
CPC ........ *G05B 19/40937* (2013.01); *B22F 10/20* (2021.01); *B33Y 50/02* (2014.12);
(Continued)

(58) Field of Classification Search
CPC .... G05B 19/40937; G05B 2219/49007; G05B 2219/49013; G05B 2219/49018;
(Continued)

(56) References Cited

U.S. PATENT DOCUMENTS 5,753,171 A * 5/1998 Serbin ................. B29C 35/0288
359/223.1
5,904,890 A * 5/1999 Lohner ................... B22F 10/30
264/401

(Continued)

FOREIGN PATENT DOCUMENTS

DE 102015204630 9/2016
WO 2013079581 6/2013

OTHER PUBLICATIONS

PhD thesis entitled "Development of a Smart Selective Laser Melting Process," by Stign Clijsters, of Arenerg Doctoral School, Faculty of Engineering Science, KU Leuven, Mar. 2017, with additional documentation relevant to publication, and a machine translation, 211 pages.

*Primary Examiner* — Lawrence Averick
(74) *Attorney, Agent, or Firm* — Seyfarth Shaw LLP (57) ABSTRACT

A method for providing control data for manufacturing at least one three-dimensional object by means of a layer-wise solidification of a building material in an additive manufacturing apparatus is provided. The method includes at least the following steps: a) determining the locations corresponding to the cross section of the at least one object, b) determining at least two different regions to be solidified in said at least one layer, wherein said at least two regions are chosen from the group of: sandwiched region, down-facing region and up-facing region, c) defining a scanning sequence for the beam so as to solidify the building material at least at the locations corresponding to said portion of the cross section of the object, wherein at an interface between a first and a second region differing from each other a scan line of the beam is continuous and at least one beam parameter value is changed.

10 Claims, 6 Drawing Sheets

(51) Int. Cl.
 *B33Y 10/00* (2015.01)
 *B22F 10/30* (2021.01)
 *G05B 19/4093* (2006.01)

(52) U.S. Cl.
 CPC .............. *B22F 10/30* (2021.01); *B33Y 10/00* (2014.12); *G05B 2219/49007* (2013.01); *G05B 2219/49013* (2013.01); *G05B 2219/49018* (2013.01)

(58) Field of Classification Search
 CPC .......... B22F 10/20; B22F 10/30; B33Y 50/02; B33Y 10/00; Y02P 10/25
 See application file for complete search history.

(56) References Cited

U.S. PATENT DOCUMENTS

| | | | |
|---|---|---|---|
| 8,845,319 B2* | 9/2014 | Oberhofer | B22F 12/00 425/375 |
| 9,713,856 B2* | 7/2017 | Fockele | B22F 10/20 |
| 10,953,601 B2* | 3/2021 | Fruth | B33Y 30/00 |
| 11,141,923 B2* | 10/2021 | Domröse | G05B 19/401 |
| 11,167,375 B2* | 11/2021 | Schiffres | B33Y 10/00 |
| 11,230,051 B2* | 1/2022 | Edelhäuser | B29C 64/153 |
| 2011/0293771 A1* | 12/2011 | Oberhofer | B29C 64/153 425/182 |
| 2014/0332507 A1* | 11/2014 | Fockele | B22F 10/20 219/121.61 |
| 2016/0332379 A1 | 11/2016 | Paternoster et al. | |
| 2018/0050423 A1 | 2/2018 | Hoferer | |
| 2020/0033835 A1* | 1/2020 | Heikkinen | B22F 10/20 |

* cited by examiner

CONTINUOUS EXPOSURE

TITLE

TECHNICAL FIELD OF THE INVENTION

The present invention is directed to a method for providing control data for manufacturing at least one three-dimensional object by means of a layer-wise solidification of a building material and to a respective method for manufacturing at least one three-dimensional object, a respective control unit and a respective apparatus.

BACKGROUND OF THE INVENTION

Methods and devices for a layer-wise manufacturing of objects from a building material are usually termed additive manufacturing methods and devices. Here, a solidification of the building material can be effected for example by supplying heat energy to the building material in that the material is irradiated with electromagnetic radiation or particle radiation or else (in stereolithography) by provoking a thermal setting reaction in the material by irradiating it with ultraviolet radiation.

In order to achieve high quality parts (e.g. parts having precise detail dimensions or desired mechanical properties such as elongation at break), WO 2013/079581 A1 aims to reduce stress in parts manufactured by laser melting. In particular, WO 2013/079581 A1 deals with the problem that unsolidified powder adjacent to material that is being solidified is not a good heat conductor. Thus, when the building material is irradiated, at positions adjacent to unsolidified powder the temperature will be higher than at positions adjacent to already solidified material, which leads to stress and accordingly to a reduced quality. In order to solve that problem, WO 2013/079581 A1 suggests adapting the energy input per unit time to the heat conductivity of the surrounding of a site to be irradiated. This is done by introducing small voxels, wherein it is determined how many voxels in the neighbourhood of a site to be irradiated contain unsolidified powder. The energy input per unit time then is adapted in accordance with the result.

Though the method of WO 2013/079581 A1 may help improving the quality, it makes it necessary to compute the number of voxels with unsolidified powder for each position to be irradiated, which is sometimes cumbersome.

SUMMARY OF THE INVENTION

Accordingly, it is an object of the present invention to provide a method for providing control data for the manufacturing of an object by means of a layer-wise solidification of a building material in an apparatus for additive manufacturing, which method allows for an easy and quick adaptation of the energy to be introduced into a material in order to induce a solidification of such material.

The object is achieved by a method according to claim 1, a manufacturing method according to claim 11, a control unit according to claim 12, a computer program according to claim 13 and an additive manufacturing apparatus according to claim 14. Further developments are described in the dependent claims. Here, features from the dependent claims and from the description related to the inventive methods may also refer to the inventive devices or vice-versa, in case there is no explicit statement that features refer only to a method and a device, respectively. Also, features disclosed with respect to a specific device may also refer to another device described in the application, in case there is no explicit statement that these features refer only to a specific device.

An inventive method for providing control data for manufacturing at least one three-dimensional object by means of a layer-wise solidification of a building material in an additive manufacturing apparatus, wherein the apparatus comprises an irradiation device for directing a beam of an electromagnetic or particle radiation onto a layer of the building material at locations corresponding to the cross-section of the at least one object in said layer so as to solidify the building material at these locations, wherein the irradiation device is adapted to scan the beam in hatch lines and/or contours and/or polylines over the applied layer, includes at least the following steps:
a) determining the locations corresponding to the cross section of the at least one object for at least one, preferably each, of a plurality of layers of building material,
b) determining at least two different regions to be solidified in said at least one layer, said at least two regions corresponding to at least a portion of a cross-section of an object in said layer, wherein said at least two regions are chosen from the group of: sandwiched region, down-facing region and up-facing region,
c) for said at least one layer defining a scanning sequence for the beam so as to solidify the building material at least at the locations corresponding to said portion of the cross section of an object, wherein said scanning sequence is defined such that at an interface between a first and a second region differing from each other a scan line of the beam is continuous, i.e. the beam is moved without interruption across the interface, wherein at least one beam parameter value is changed at the interface, and providing control data for the control of said irradiation device in said additive manufacturing apparatus in accordance with the scanning sequence defined in step c) for a solidification of the building material in said at least one layer.

Here, the term "scan line" refers to the path of a beam across the building material. In principle, there exist scanning strategies for moving a beam across the material: In a hatch line scanning or "hatching" the beam is moved along lines parallel to each other, usually by hatching sub-region after sub-region within a cross-section. In polyline scanning a (portion of a) cross-section is scanned using parallel lines that are preferably in parallel to the contour of said portion. In contour scanning the contour (or edge) of a (portion of a) cross-section is scanned such that the beam is moved along the contour line of said (portion of a) cross-section. The term "scanning sequence" here means the chronological order by which the beam is moved across positions of a layer of building material. The term "down-facing region" refers to parts of an object cross-section that are located on building material remaining unsolidified during the manufacture of an object. Such a region often is alternatively termed "downskin" region. The term "up-facing region" refers to parts of object cross-sections that will be covered by building material that has remained unsolidified after the object has been manufactured. Such parts of object cross-sections often are alternatively termed "upskin" regions. The term "sandwiched region" or "sandwich region" refers to a region in a cross-section that during the manufacture of the object is located completely on solidified material in the layer beneath and will be covered completely by solidified material in the layer above.

By scanning the beam across different regions using a continuous scan line, a scanning of a cross-section will be effected in a shorter time as there will be less stops of the beam at boundaries between different regions and less "transfer periods", meaning time periods, in which the beam is transferred to a different part of a cross-section without supplying energy to the building material within such time period. Furthermore, there will be less stress generated in a cross-section that is solidified, because adjacent positions to be solidified that are located in different regions will be solidified with no time delay. Accordingly, e.g. a sandwiched region will not already have cooled down when the material in e.g. a down-facing (also called downskin) region is heated up in order to effect a solidification. Thus, the temperature difference between positions in the sandwiched region and positions in the downskin region that are solidified is small and less stress is generated. As a result, curl effects are less probable and a destruction of the part during the manufacturing process is less probable. Less stress during the manufacture of an object usually also results in a higher precision of details. Different energy parameters for two different regions are taken into consideration by changing at least one beam parameter value at the interface between two regions. Finally, it should be remarked that the invention is not limited to additive manufacturing apparatuses comprising only one single irradiation device or only one single beam. It is equally applicable to additive manufacturing apparatuses, in which more than one beam can be scanned over an applied layer.

Preferably, the at least one beam parameter value that is changed at the interface is chosen from the group of: beam power, a beam diameter, a beam shape and/or position of the focus of the beam and/or scanning velocity.

There are several possibilities for changing beam parameter values at an interface between two regions within the scope of the present invention. Which beam parameter values are to be changed will e.g. depend on the specific additive manufacturing apparatus that is used, such as the kind of irradiation device, the size of the object to be manufactured, the type of building material, etc. The position of the focus of the beam refers to the position of the beam focus perpendicular to a building material layer. The position e.g. may be at the top side of the building material layer, at the bottom side thereof, somewhere in-between the latter two positions or even completely outside of the building material layer.

Preferably, the at least one beam parameter value is changed in accordance with a pre-defined set of beam parameter values when the scan line passes from said first region to said second region, wherein a pre-defined set of parameter values is assigned to each region.

By defining a set of beam parameter values for each region in advance, the inventive method is easier to apply as no comprehensive considerations and calculations, respectively, have to be made for assigning beam parameters and respective beam parameter values to a region.

Preferably, the pre-defined sets of beam parameter values are chosen such that the energy input per unit area in downfacing regions is lower than in sandwiched regions and/or the energy input per unit area in up-facing regions is higher than in sandwiched regions.

By such preferred implementation of the method the energy input per unit area and time can be adapted to different properties of the surrounding at a position of the building material layer at which the beam is directed. In particular, the energy input per unit area is chosen to be smaller in down-facing regions than in the sandwiched region, because down-facing regions (downskin regions) are located above unsolidified powder, which powder has a smaller heat conduction than solidified material. On the other hand, in up-facing regions (upskin regions) the energy input per unit area has to be higher.

Preferably, said first region and said second region are scanned using hatch lines.

The present invention is particularly advantageous when being applied to portions of a cross-section that are solidified by hatching. Hatching usually is applied for solidifying areas inside of an object cross-section that are often not so small. Thus, by the inventive method stress will be reduced in areas of the cross-section that are not so small, meaning stress is considerably reduced in the object cross-section. Moreover, scanning a region by means of hatching consumes a considerable amount of time, wherein by the inventive method ineffective "jumps" of the beam can be avoided and thus the time needed for a solidification of a cross-section can be remarkably reduced.

When the distance between neighboring hatch lines is essentially constant, it is easier to implement a uniform energy input per unit area.

The inventive method is also effective when being applied to contour regions of an object cross-section such that said first region and said second region are scanned using contours. Also in such case, redundant jumps of the beam are avoided.

Furthermore, the invention is also applicable to cases, in which said first region and said second region are scanned using polylines. A polyline usually is defined as a set of points connected contiguously by straight line segments. A closed polyline can for example be called a polygon. Here, a scanning using polylines refers in particular to a scanning of a portion of a cross-section using parallel lines that are preferably in parallel to the contour of said portion. Such a scan type can for example be implemented by moving the beam along onion-shaped closed lines.

As it is easy to change beam parameters for laser radiation, such as the beam power or the beam diameter, the inventive method is advantageously applied in an additive manufacturing apparatus using laser radiation for a solidification of the building material.

Preferably, the building material is a powder, preferentially a metal powder. When using a metal powder as building material, usually most of the energy necessary for a solidification of the powder is introduced into the material by the beam. This means that a temperature difference between a position where the beam acts on the powder material and another position will be usually higher than for other materials such as plastic powders. Accordingly, stress problems will be more likely to occur for metal powders. Thus, the inventive method is advantageous particularly for metal powders as the method is able to reduce stress.

An inventive method for manufacturing at least one three-dimensional object by means of a layer-wise solidification of a building material in an additive manufacturing apparatus, comprises the following steps:
 receiving control data provided in an inventive method for providing control data, and
 manufacturing said three-dimensional object on the basis of said control data by repeating the steps of applying layers of the building material and selectively solidifying said layers until the at least one three-dimensional object is finished.

According to the invention either the inventive control data may be prepared in advance of the additive manufacturing method, so that an additive manufacturing apparatus may simply carry out the manufacturing process in accordance with said control data, or said control data may be provided during the manufacturing process. In the latter case the control data may be received while the manufacturing process of an object in said additive manufacturing apparatus is on-going.

An inventive control unit for an additive manufacturing apparatus is adapted to carry out an inventive method for providing control data and/or an inventive method for manufacturing at least one three-dimensional object.

An inventive computer program comprises a sequence of instructions that enables an additive manufacturing apparatus to carry out an inventive method for manufacturing at least one three-dimensional object and/or that enables an inventive control unit to carry out an inventive method for providing control data and/or an inventive method for manufacturing at least one three-dimensional object.

An inventive control unit may for example have an inventive computer program in a memory, so that the control unit may carry out the inventive method. In particular, the control unit may be a usual control unit for an additive manufacturing apparatus that has been adapted so as to be able to carry out an inventive method.

An inventive additive manufacturing apparatus for manufacturing at least one three-dimensional object by means of a layer-wise solidification of a building material comprises an irradiation device for supplying a beam of an electromagnetic or particle radiation onto a layer of the building material at locations corresponding to the cross-section of the at least one object in said layer so as to solidify the building material at these locations, wherein the irradiation device is adapted to scan the beam in hatch lines and/or contours and/or polylines over the applied layer, wherein the apparatus is adapted to repeat the steps of applying layers of the building material and selectively solidifying said layers until the at least one three-dimensional object is finished, and wherein the apparatus further comprises an inventive control unit or is connected to receive signals from an inventive control unit.

Such inventive apparatus may not only be implemented by comprising or being connected to an inventive control unit. Rather, the apparatus may also be configured so as to be able to carry out an inventive method for providing control data. In such case it is particularly easy to provide the control data while the manufacturing process of the related object is on-going.

BRIEF DESCRIPTION OF THE DRAWINGS

In the following the invention will be described by making reference to the drawings, wherein.

DETAILED DESCRIPTION OF THE EMBODIMENTS

For a better understanding of the invention, in the following a laser sintering or melting device as example of an additive manufacturing device according to the invention will be described with reference to FIG. 1. By means of an inventive additive manufacturing device not only one object but also several objects may be manufactured at the same time, even in cases in which only one object is mentioned.

For building an object 2 the laser sintering or melting device 1 comprises a process chamber or building chamber 3 having a chamber wall 4.

A building container 5, which is open to the top and which has a container wall 6 is arranged in the process chamber 3. The opening at the top of the building container 5 defines a work plane 7. The part of the work plane 7 that lies inside of the opening and that can be used for building the object 2 is designated as construction field 8.

A support 10 that can be moved in a vertical direction V is arranged in the building container 5. A bottom plate 11 is attached to the support 10, which bottom plate 11 seals the container 5 at the bottom and thus forms the container bottom. The bottom plate 11 may be a plate formed separately from the support 10 and fixed to the support 10. Alternatively, the bottom plate 11 may be formed integrally with the support 10. Depending on the powder that is used and on the process that is used, it is possible that a further building platform 12 is mounted on the bottom plate 11 as building support, on which the object 2 is built. Though such a building platform 12 is exemplarily shown in FIG. 1, the object 2 may also be built on the bottom plate 11 itself, which then serves as building support.

Moreover, in FIG. 1 the object 2 that is to be formed in the container 5 on the building platform 12 is shown below the work plane 7 in an intermediary state with several solidified layers that are surrounded by building material 13 that remained unsolidified.

Figure 1:
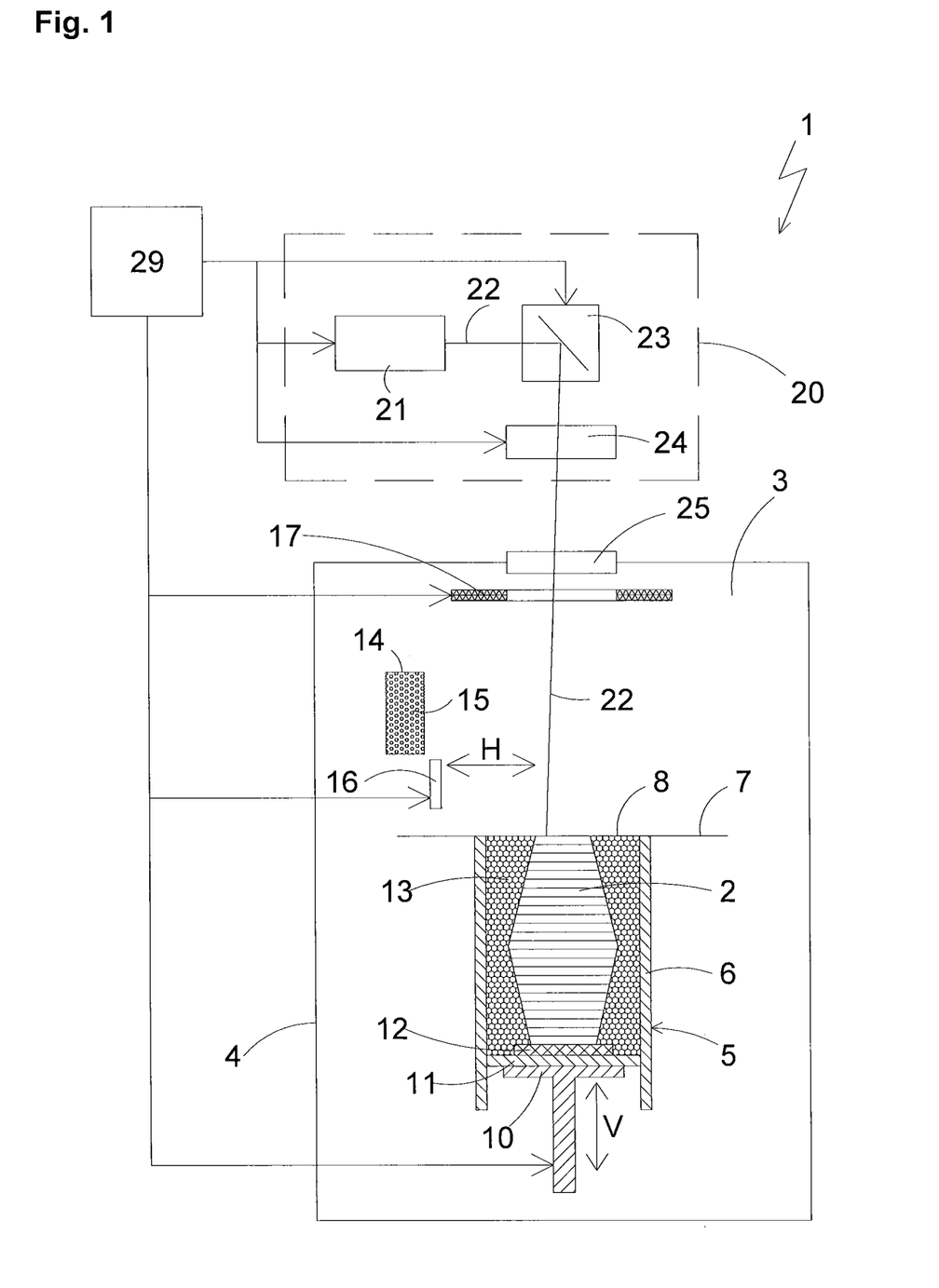
FIG. 1 is a schematic illustration of an exemplary additive manufacturing apparatus according to the invention.

The laser sintering or melting device 1 in FIG. 1 contains a supply container 14 for a building material 15 (in this example a powder that can be solidified by means of electromagnetic radiation) and a recoater 16 that can be moved in a horizontal direction H for applying the building material 15 inside of the construction field 8. Optionally, a radiative heating 17 such as an infrared radiator may be arranged in the process chamber 3, which radiative heating 17 serves for a heating of the applied building material 15.

The laser sintering or melting device 1 shown in FIG. 1 contains an illumination device 20 having a laser 21 that generates a laser beam 22, which is deflected by a deflection device 23 and is focused onto the work plane 7 by means of a focusing device 24 via a coupling window 25 that is arranged at the top of the process chamber 3 in the chamber wall 4.

Furthermore, the laser sintering device 1 comprises a control device or control unit 29 by means of which the individual parts of the device 1 are controlled in a coordinated way for carrying out the building process. Alternatively, parts of the control device 29 or the complete control device may be arranged outside of the laser sintering device 1. The control device may comprise a CPU, the operation of which is controlled by a computer program (software). Such computer program can be stored on a storage medium inside of the control device 29. Alternatively, it may be stored on a storage medium remote from the device 1, from which storage medium it is then loaded, e.g. via a network, into the device 1, particularly into the control device 29.

When the device 1 is in operation, the support 10 is lowered by one layer by the control device 29, the recoater 16 is controlled by the control device 29 such that it applies a new layer of building material and the deflection device 23 and, if necessary, also the laser 21 and/or the focusing device 24 are controlled such that the laser scans positions in a respective layer that correspond to a cross-section of the object in such layer, so that the building material is solidified at the respective positions.

In a laser sintering or laser melting method an illumination device may for example comprise one or more gas or solid state lasers or any other kind of lasers such as laser diodes, in particular VCSELs (vertical cavity surface emitting lasers) or VECSELs (vertical external cavity surface emitting lasers) or it may comprise a linear arrangement of such lasers. Irrespective of the fact, whether for example by a linear arrangement of lasers or by other measures the radiation incident on the building material is line-shaped or covers a certain area, throughout this specification the term "beam" is used for describing a ray bundle hitting the building material. It is further noted that the specific setup of a laser sintering or melting device shown in FIG. 1 is only by way of example and of course could be changed in many ways.

Even if in FIG. 1 a laser sintering or melting device was described as example for an additive manufacturing device, the invention is not restricted to laser sintering or laser melting. In case the additive manufacturing method is not a laser sintering or laser melting method, the illumination device 20 may be replaced by another energy introduction device. In general, instead of a laser any device, by means of which energy may be selectively introduced into a layer of the building material using electromagnetic radiation or particle radiation can be used. For example, instead of a laser, an electron beam emitting device may be used. In the case of a stereolithographic method the solidification device is an ultraviolet light source.

Thus, the further explanations are not meant to be limited to a laser sintering or laser melting device, even if only a laser sintering or laser melting device is mentioned.

Various materials may be used as building material in an additive layer-wise manufacturing method according to the present invention, preferably powders or pastes, in particular metal powders, but also plastic powders, ceramic powders or sand. Also the use of filled or mixed powders is possible. Liquid photo polymers are used particularly in stereolithography.

When carrying out the above-described exemplary additive layer-wise manufacturing method, the control device 29 executes instructions according to a set of control commands, which instructions specify the application of layers of the building material one after the other and specify regions in each layer that are to be irradiated with radiation in order to solidify the building material. Such regions correspond to a cross-section of an object to be manufactured in the respective layer. Thus, the control command set contains information on the positions in a layer that have to be solidified The control command set is based on a computer-based model of one or more objects to be manufactured, preferably a CAD volume model. It usually also contains the layer information, i.e. the way in which one or more objects to be manufactured are split up into layers that correspond to the building material layers during the layer-wise additive manufacturing. Here, those control data that are related to a single layer are designated as layer data set.

Furthermore, also information specific to the manufacturing process usually is included in the command control set, e.g. the position and orientation of the objects in the container 5 or a beam diameter of the laser beam when it hits the building material (in or near the top-most building material layer). The control command set may in particular also specify the thickness of each building material layer to be applied during the manufacturing process. In particular, the control command set may comprise all data necessary for a control of the illumination device such as the energy density of the radiation emitted by the illumination device and the scan velocity of the beam.

In summary, the control command set may be regarded as the total of all control data that are provided for the control of the manufacturing process in an additive layer-wise manufacturing device.

Figure 2:
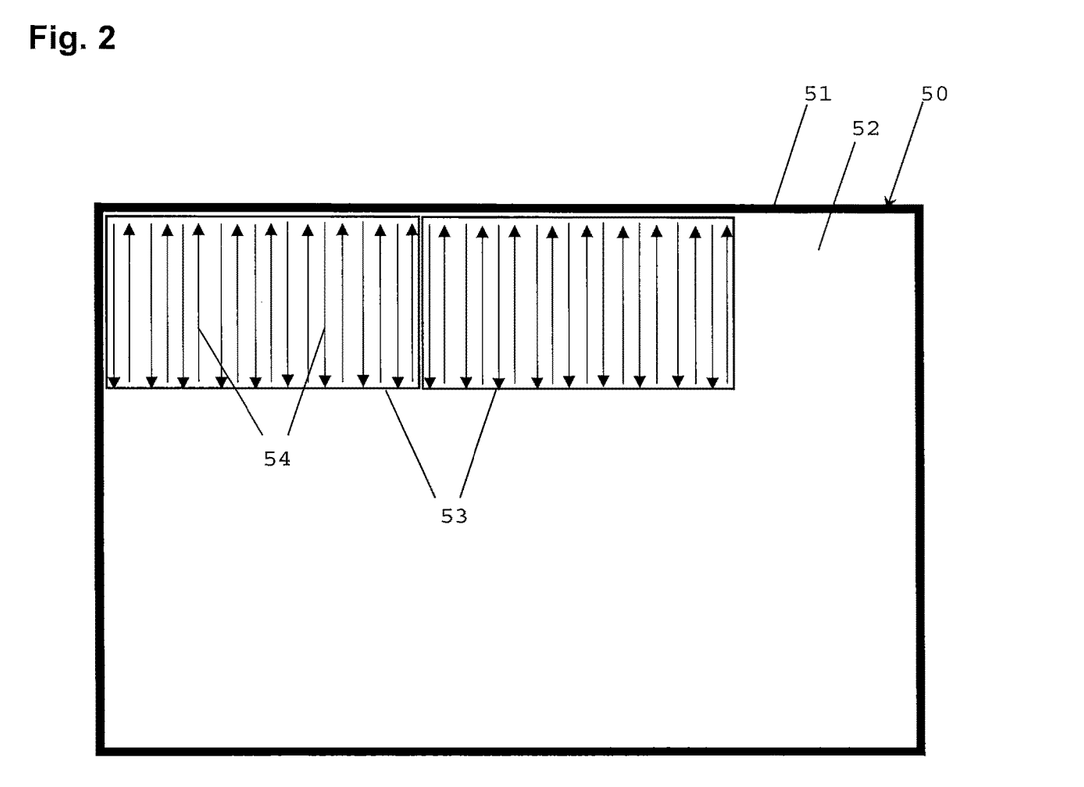
FIG. 2 illustrates a scanning strategy known to the inventors.

FIG. 2 illustrates a strategy known to the inventors for scanning a beam across an object cross-section to be solidified. The invention preferably also makes use of such a strategy. In FIG. 2 an exemplary cross-section of an object 2 is shown. In the example such cross-section has a rectangular shape. As illustrated in FIG. 2, the cross-section 50 is divided into a bulk or core region 52 (sometimes also termed bulk or core area) and a contour region 51 (sometimes also termed bulk or core area). While the contour region 51 usually is solidified by scanning the laser beam along the contour following the line shape of the contour of the cross-section, the core region usually is solidified by defining sub-regions 53 that are usually, but not necessarily, of a rectangular or quadratic shape. As is illustrated in FIG. 2, a sub-region 53 is solidified by scanning the laser beam back and forth in parallel lines 54 back and forth, which kind of scanning usually is termed "hatching". Usually, the bulk region 52 is solidified sub-region by sub-region. It has to be noted that the laser beam need not necessarily be scanned back and forth. Rather, it is also possible to scan across a sub-region always in the same direction. With respect to FIG. 2 this would mean that all arrows would point into the same direction (either upwards or downwards).

Besides hatching a scanning of a bulk region in a so-called "polyline" fashion, e.g. by scanning across the material in lines that are in parallel to an outer contour of (portion of) a cross-section (sometimes termed "onion-ring" scanning) is also well-known.

Figure 3:
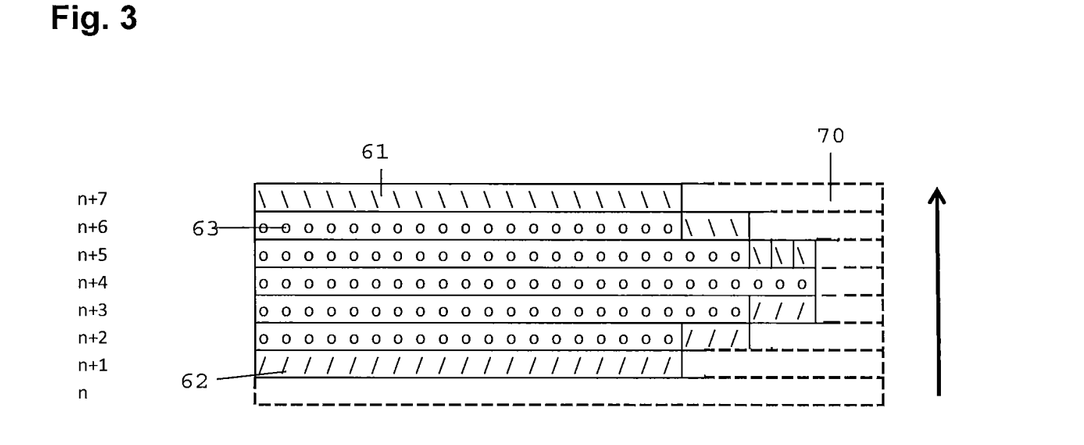
FIG. 3 shows a cut through a portion of an object during its manufacture in order to illustrate the different regions defined within the context of the present invention.

FIG. 3 illustrates a strategy for taking into consideration the amount of unsolidified building material near a position that is irradiated, which strategy is applied in the present invention. In particular, FIG. 3 shows a side view of a portion of an object that is manufactured by an additive manufacturing method. This side view is similar to the view on the object 2 in FIG. 1. The object portion shown in FIG. 3 comprises seven object cross-sections in layers n+1 to n+7, wherein the arrow in the right part of the figure shows the direction in which the object is built layer upon layer. In all layers the region 70, in which powder remains in an unsolidified state, is shown without filling and with a broken line as boundary.

Furthermore, in FIG. 3 so-called downskin regions 62 can be recognized. These are parts of an object cross-section that are located on building material remaining unsolidified during the manufacture of an object and thus consist of object surfaces facing downwards (towards the support 10) during the manufacture of the object 2. The downskin regions 62 are illustrated in FIG. 3 by slashes "/". When defining downskin regions (or down-facing regions) 62, it is possible to assign to all positions in a downskin region, preferably all downskin regions, the same beam parameter values. Thereby it is possible to take into consideration a low heat conduction of the material underlying such regions by reducing the energy introduced in such regions by the beam. Proceeding like that is easier than assigning to each position in a cross-section individual beam parameter values and energy input values, respectively.

FIG. 3 also shows regions 61 illustrated by back slashes "\". These regions are termed upskin regions as they are parts of object cross-sections that will be covered by building material that has remained unsolidified after the object has been manufactured. Thus, the upskin regions 61 consist of object surfaces facing upwards (facing away from the support 10) during the manufacture of the object. When defining upskin regions (an alternatively usable term for up-facing regions) 61, it is possible to assign to all positions in an upskin region, preferably all upskin regions, the same beam parameter values. The inventors have found that in regions covered with unsolidified material it is preferable to have an especially high energy input per unit time and unit area. Providing an increased energy input per unit time and unit area at all positions in an upskin region is easier than assigning to each position individual beam parameter values and energy input values, respectively.

Finally, in FIG. 3 there can be recognized regions 63 marked by circles "◯". These regions in a cross-section have solidified material in the layer above and in the layer below and in the following will be termed sandwiched regions. When defining sandwiched regions 63, it is possible to assign to all positions in a sandwiched region substantially the same beam parameter values.

It is to be noted that for ease of explanation FIG. 3 does not show any contour regions. However, such contour regions in the same way as bulk regions could be either sandwiched, upskin or downskin regions.

In a scanning strategy known to the inventors, regions 61 and 62 in FIG. 3 in each layer are solidified separately from regions 63. The scanning strategy according to the present invention differs from that, as will be described by referring to FIGS. 4 to 6.

Figure 4A:
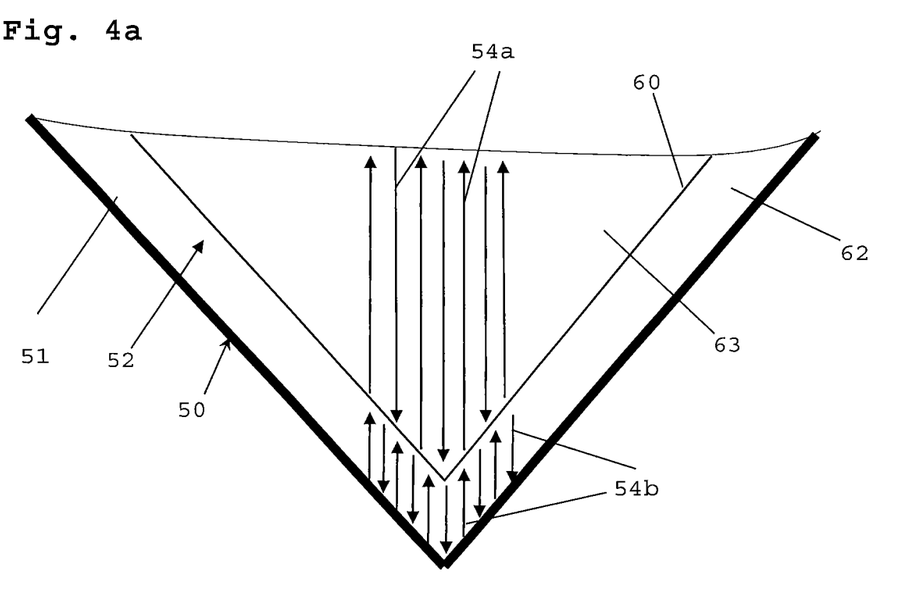
FIGS. 4a and 4b show top views on a portion of an object cross-section in order to compare a scanning strategy known to the inventors to a scanning strategy according to an embodiment of the invention.
Figure 4B:
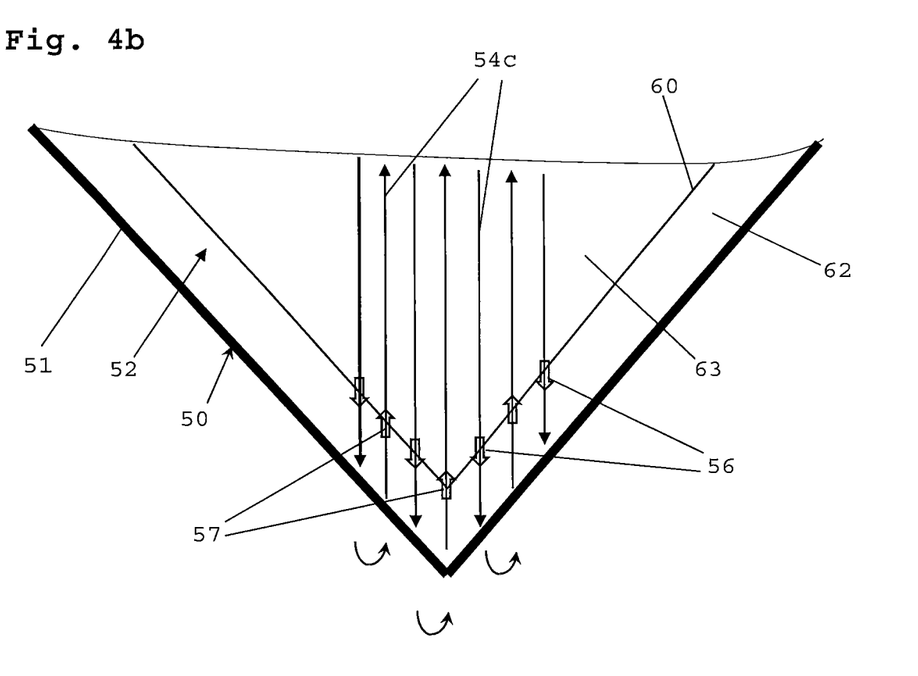
Figure 5:
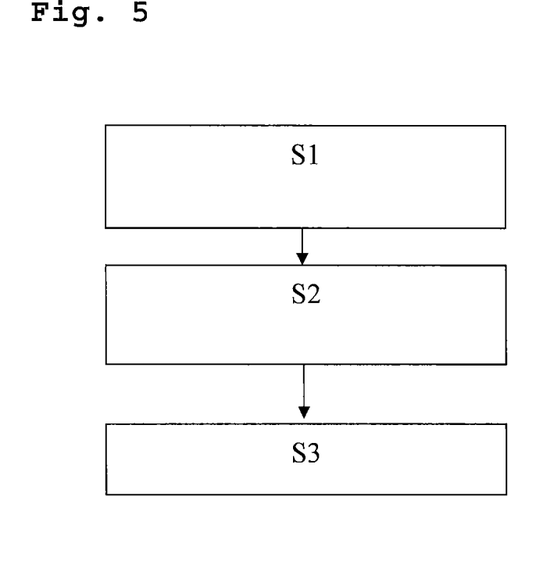
FIG. 5 is a schematic illustration of a method of providing control data according to an embodiment of the invention and FIG. 6 is a schematic illustration of a setup of a device for providing control data according to an embodiment of the invention.
Figure 6:
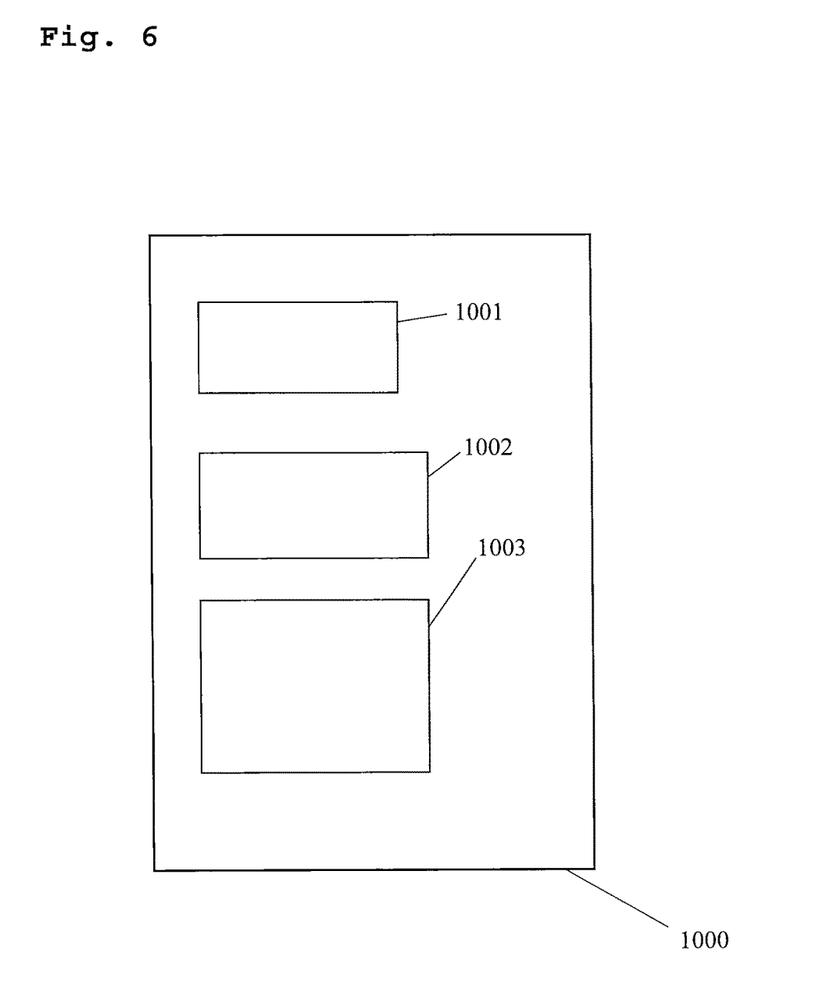

As can be seen in FIG. 6, an inventive device 1000 for providing control data for an additive manufacturing apparatus comprises an access unit 1001, a scanning sequence definition unit 1002 and a control data provision unit 1003. The operation of the device 1000 for providing control data will be described by making reference to FIG. 5. FIGS. 4*a* and 4*b* serve for a further illustration of the invention, wherein each of FIGS. 4*a* and 4*b* shows a top view on a portion of an object cross-section in a particular layer to be solidified, e.g. layer n+2 in FIG. 3.

In the device shown in FIG. 6 the access unit 1001 accesses a layer data set of an object to be manufactured, and thus is adapted to carry out a first step S1 (see FIG. 5) of an inventive method for providing control data for an additive manufacturing apparatus. The term "accessing" here means that the access unit 1001 reads a layer data set from a memory or else receives data corresponding to a layer data set via a network. It is also possible that the access unit accesses a memory in the device 1000 itself, in which memory the layer data set is stored.

As already mentioned further above, a layer data set comprises information on a respective building material layer. In particular, a layer data set specifies those positions of the respective building material layer, at which the building material shall be solidified by directing one or more beams onto the building material layer for a manufacture of the object. Of course, there may also be specified further process information (e.g. layer thickness or beam diameter, etc.) in the layer data set.

For the present invention it is assumed that the layer data set already specifies, which areas of at least a portion of a cross-section are sandwiched regions, down-facing (i.e. downskin) regions and up-facing (i.e. upskin) regions. If no layer data set with such specific information is available, such a layer data set may be generated in advance of the inventive method, in particular by the inventive device 1000 itself, which then has to have access to computer-based CAD data of the object.

In step S2 shown in FIG. 5, the layer data set accessed by access unit 1001 in step S1 is modified. In particular, for at least a portion of an object cross-section to be solidified in the respective layer a scanning sequence of a beam used for solidification is defined. The term "scanning sequence" here means the chronological order by which one or more beams are to be moved across positions of a layer of building material corresponding to the cross-section.

In more detail, in at least a portion of a cross-section a scanning sequence is defined such that at an interface between an sandwiched region and a down-facing region (downskin region) or an interface between an sandwiched region and an up-facing region (upskin region) or an interface between an up-facing region and a down-facing region the beam is moved continuously, which means it is moved such that it crosses the interface without interruption. This will be illustrated by reference to FIGS. 4*a* and 4*b*, wherein FIG. 4*a* illustrates a scanning sequence as it was previously used by the inventors and FIG. 4*b* illustrates a scanning sequence in accordance with the present invention.

FIG. 4*a* shows a portion of an object cross-section to be solidified in a specific layer, e.g. layer n+2 in FIG. 3. Like in FIG. 2, the contour of the cross-section 50 is designated by reference number 51 and the bulk region is designated by reference number 52. As can be seen, the bulk region 52 consists of a sandwiched region 63 and a downskin (down-facing) region 62. From the geometry shown in FIG. 4*a* it is clear that the contour 51 also would be considered as downskin region, which, however, does not need to be detailed here. The present explanation may analogously applied to the contour region.

Also shown in FIG. 4*a* are parallel hatch lines 54*a* along which the beam is moved in order to solidify the sandwiched region 63. Of course, such hatching could be implemented by defining sub-regions as it was illustrated in FIG. 2. In the manufacturing method known to the inventors, the solidification of the sandwiched region 63 and the solidification of the downskin region 62 are effected separately, meaning the solidification of one region is completed before the solidification of the other region starts. This is illustrated in FIG. 4*a* by separate hatch lines 54*b*, along which the beam is scanned for a solidification of the downskin region 62. Usually, the beam parameter values are chosen to be different for the downskin region as compared to the parameter values for the sandwiched region. For example, a beam power is reduced in the downskin region or else a beam diameter, a beam shape or a scan velocity or other appropriate parameters are chosen to be different in the downskin region.

The inventors noticed that by a scanning sequence as illustrated in FIG. 4*a* stress was induced into the part. The inventors assume that when the sandwiched region 63 and the downskin region 62 are solidified separately, there is a time gap between a heating up of the building material at the interface 60 between regions 62 and 63. For instance, when region 63 is solidified at first, material in region 63 is heated up and will have cooled down again at the time when the material in the downskin region 62 is heated up for a solidification thereof. Thus, the temperature difference between positions in the sandwiched region 63 away from the interface 60 and positions at the interface 60 will lead to stress within the object cross-section to be formed. Furthermore, when treating the sandwiched region 63 and the downskin region 62 separately, there will be ineffective time periods, during which the beam is moved across the cross-section without acting on the building material, e.g. when the beam is moved to a particular position of the downskin region after the sandwiched region has been completely solidified.

As a result of the before-mentioned considerations, the inventors have devised a scanning sequence illustrated in FIG. 4b. FIG. 4b shows the same portion of an object cross-section as FIG. 4a. However, as is immediately apparent from FIG. 4b, hatch lines 54c for solidifying the sandwiched region 63 no longer end at an interface 60 to the downskin region 62. Rather, hatch lines 54c run across the interface 60 crossing such interface at positions 56 and 57 (positions at which at the interface 60 the scan direction is towards the bottom of the page are designated by reference number 56 and positions at which at the interface 60 the scan direction is towards the top of the page are designated by reference number 57). By using such a scanning sequence, the temperature differences between the inner part of sandwiched region 63 and the interface 60 are much lower than in FIG. 4a. Also, there are no ineffective movements of the beam.

Of course, when the beam crosses the interface 60, the beam parameter values have to be adapted by the scanning sequence definition unit 1002, so that a different amount of energy per unit area and time is introduced into the downskin region compared to the sandwiched region.

Referring again to the inventive method illustrated in FIGS. 5 and 6, when a scanning sequence is defined in step S2, the layer data set is modified in step S2 in order to take into consideration the scanning sequence defined in step S2. Furthermore, changes of beam parameter values are also specified in the modified layer data set. As a result, the modified layer data set includes information on the chronological sequence, in which at least a portion of an object cross-section has to be solidified.

In step S3 the modified layer data set is provided by control data provision unit 1003 shown in FIG. 6 for a use in a manufacturing process of the respective object. In particular, the modified layer data set can be integrated into a control command set for the operation of an additive manufacturing apparatus for manufacturing the mentioned object. Here, it is also possible that the control data provision unit 1003 itself integrates the modified layer data set into a corresponding control command set instead of forwarding the modified layer data set to another device responsible for the integration. It should also be emphasized here that on the one hand the inventive device 1000 may modify all layer data sets of an object that comprise interfaces between sandwiched and up-/downskin regions and then provide the control data for all modified layer data sets. On the other hand, it is also possible that control data are provided dynamically, meaning during the manufacturing of an object layer by layer in the additive manufacturing apparatus.

It is remarked that an implementation of changes of beam parameter values at an interface during the additive manufacturing process is not difficult. The control unit 29 may control the illumination device 20 accordingly. Finally, though the example of FIGS. 4a and 4b did not mention upskin regions, the invention may be implemented to upskin regions in the same way. In FIGS. 4a and 4b the downskin regions 62 merely have to be replaced by upskin regions.

In general, though the inventive method was described for the example of an interface between a sandwiched region and a down-facing (downskin) region, the invention may be effected in the same way for an interface between an sandwiched region and an upskin (up-facing) region. In such case one will aim at changing the beam parameters at an interface such that more energy per unit area and time is introduced into the upskin region than in the sandwiched region. Furthermore, the inventive method can also be applied to situations, where the contour of an object cross-section changes between sandwiched and upskin/downskin or in a situation, in which the beam is moved across an object cross-section in polylines. In the latter two cases a scanning sequence is defined such that at interfaces between sandwiched and upskin/downskin regions the beam is moved continuously, i.e. without interruptions.

Finally, it shall be mentioned that an inventive device 1000 for providing control data for an additive manufacturing apparatus may not only be implemented via software components alone but also by means of hardware components, in particular by means of mixtures from hardware components and software components.

The invention claimed is:

1. A method for providing control data for manufacturing at least one three-dimensional object by layer-wise solidification of a building material in an additive manufacturing apparatus, wherein the apparatus comprises an irradiation device for directing a beam of electromagnetic or particle radiation onto a layer of the building material at locations corresponding to a cross-section of the at least one object in the layer so as to solidify the building material at the locations, wherein the irradiation device is adapted to scan the beam in at least one of hatch lines, contours, and polylines over the layer, wherein the method includes at least the following steps:

a) determining the locations corresponding to the cross section of the at least one object for at least one of a plurality of layers of building material;

b) determining at least two different regions to be solidified in the at least one layer, the at least two regions corresponding to at least a portion of the cross-section of the object in the layer, wherein the at least two regions are selected from the group consisting of a sandwiched region, a down-facing region, and an up-facing region;

c) assigning a pre-defined set of beam parameter values to each region, the pre-defined set of beam parameter values being selected such that the energy input per unit area in the down- facing regions is lower than in the sandwiched regions and/or the energy input per unit area in the up-facing regions is higher than in the sandwiched regions;

d) defining, for the at least one layer, a scanning sequence for the beam so as to solidify the building material at least at the locations corresponding to the portion of the cross section of the object, wherein the scanning sequence is defined such that a scan line of the beam is moved without interruption across an interface between a first and a second region differing from each other, wherein at least one beam parameter value is changed at the interface in accordance with the pre-defined set of beam parameter values when the scan line passes from the first region to the second region; and providing control data for the control of the irradiation device in the additive manufacturing apparatus in accordance with the scanning sequence defined in step d) for a solidification of the building material in the at least one layer.

2. The method according to claim 1, wherein the at least one beam parameter value that is changed at the interface is selected from the group consisting of a beam power, a beam diameter, a beam shape, a position of the focus of the beam, and a scanning velocity.

3. The method according to claim 1, wherein the first region and the second region are scanned using hatch lines.

4. The method according to claim 3, wherein the distance between neighboring hatch lines is essentially constant.

5. The method according to claim 1, wherein the first region and the second region are scanned using contours.

6. The method according to claim 1, wherein the radiation is electromagnetic radiation supplied by a laser.

7. The method according to claim 1, wherein the building material is a metal powder.

8. A method for manufacturing at least one three-dimensional object by layer-wise solidification of a building material in an additive manufacturing apparatus, the method comprising the following steps:

receiving control data provided in a method according to claim 1, and manufacturing the three-dimensional object on the basis of the control data by repeating the steps of applying layers of the building material and selectively solidifying the layers until the at least one three-dimensional object is completed.

9. A control unit for an additive manufacturing apparatus that is adapted to carry out the method according to claim 1.

10. A method for providing control data for manufacturing at least one three-dimensional object by layer-wise solidification of a building material in an additive manufacturing apparatus, wherein the apparatus comprises an irradiation device for directing a beam of electromagnetic or particle radiation onto a layer of the building material at locations corresponding to a cross-section of the at least one object in the layer so as to solidify the building material at the locations, wherein the irradiation device is adapted to scan the beam in at least one of hatch lines, contours, and polylines over the layer, wherein the method includes at least the following steps:

a) determining the locations corresponding to the cross section of the at least one object for at least one of a plurality of layers of building material;

b) determining at least two different regions to be solidified in the at least one layer, the at least two regions corresponding to at least a portion of the cross-section of the object in the layer, wherein the at least two regions are selected from the group consisting of a sandwiched region, a down-facing region and an up-facing region;

c) defining, for the at least one layer, a scanning sequence for the beam so as to solidify the building material at least at the locations corresponding to the portion of the cross section of the object, wherein the scanning sequence is defined such that the first region and the second region are scanned using polylines and a scan line of the beam is moved without interruption across an interface between a first and a second region differing from each other, wherein at least one beam parameter value is changed at the interface; and providing control data for the control of the irradiation device in the additive manufacturing apparatus in accordance with the scanning sequence defined in step d) for a solidification of the building material in the at least one layer.

* * * * *